Nov. 8, 1938.  W. J. McGOLDRICK  2,135,829
CONTROL
Filed Aug. 17, 1936    4 Sheets-Sheet 1

William J. McGoldrick,
Inventor,
Delos G. Haynes,
Attorney.

Nov. 8, 1938. W. J. McGOLDRICK 2,135,829
CONTROL
Filed Aug. 17, 1936 4 Sheets-Sheet 2

William J. McGoldrick, Inventor,
Delos F. Haynes, Attorney.

Nov. 8, 1938.     W. J. McGOLDRICK     2,135,829
CONTROL
Filed Aug. 17, 1936         4 Sheets-Sheet 3

William J. McGoldrick, Inventor,
Delos G. Haynes, Attorney.

Nov. 8, 1938.  W. J. McGOLDRICK  2,135,829
CONTROL
Filed Aug. 17, 1936  4 Sheets-Sheet 4

FIG. 7.

William J. McGoldrick,
Inventor,
Delos G. Haynes,
Attorney.

Patented Nov. 8, 1938

2,135,829

UNITED STATES PATENT OFFICE 2,135,829

CONTROL

William J. McGoldrick, Marshfield, Mass., assignor, by mesne assignments, to Metals & Controls Corporation, Attleboro, Mass., a corporation of Massachusetts Application August 17, 1936, Serial No. 96,446

16 Claims. (Cl. 158—28)

This invention relates to controls, and with regard to certain more specific features, to a control means together with a circuit embodying the same, for motor-driven oil burners.

Among the several objects of the invention may be noted the provision of a control for motor-driven oil burners, and a circuit therefor, which provides automatically for a period of trial operation, thereafter functioning to continue operation of the motor if combustion is successful, but discontinuing operation of the motor if combustion is unsuccessful, and, in the latter instance, automatically setting up a locked condition in which a manual operation is necessary in order to restore the control to automatic functioning; and the provision of a control and circuit therefor of the class described which is equipped to handle automatically substantially any failure or the like that is encountered in normal or abnormal operation of a motor-driven oil burner. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention—

Similar reference characters indicate corresponding parts throughout the several views of the drawings.

The present invention discloses a novel means of automatically starting motor-driven oil burner systems, and automatically preventing a continuation of starting attempts when operation is undesirable.

In automatically starting systems of this type, for example, the usual sequence of events which are cycled by such control means are:

1. Response to demand of auxiliary apparatus, such as a room thermostat and a combustion control.
2. Starting of oil burner motor on trial basis.
3. Turning on ignitor.
4. Detecting combustion.
5. Turning off ignitor when combustion is assured (optional).
6. Continuing operation of oil burner motor as long as there is combustion and demand.
7. When demand is satisfied, shutting down burner and preparing for repetition of the above events on renewal of the demand for heat.

In motor driven oil burning systems, certain events in themselves or by a combination of their separate effects may make it advisable to interrupt starting and make further attempts at starting impossible until the cause of trouble is determined and remedied. In such cases the control means should cause the system to shut down, and should remain locked out until the trouble is corrected, after which the control means should, upon being reset manually, function in its regular fashion.

Events, for example, such as power supply failure, fuel failure, ignition failure, or flame failure, should cause the control means to act as a safety device on a false start. Power failure, for instance, may be a matter of complete loss of power, or it may be only a momentary or intermittent interruption. Again, it might be in the form of a drop in line voltage, causing inadequate fuel turbulence with attendant decrease in combustion efficiency, conceivably resulting in the loading of the combustion chamber with inflammable but unburned liquids in the presence of an open flame. It is possible that under this condition such unburned liquid fuel might be heated to the point of vaporization and ignite, some of it flowing outside the base of the burner while aflame.

The matter of fuel failure may likewise be complete, due to the consumption of the supply, or partial, due to the clogging of the feed line or nozzle, or breakdown of the pump supplying it.

In the case of ignition failure, common control means allow several starting attempts when ignition is not first successful. While it is true that a short time interval elapses between each of such trials, it is maintained that only one attempt should be made. This is because motor-driven oil burners are commonly designed to supply fuel under pressure in a finely subdivided state and intimately mixed with a turbulent stream of air. If ignition does not occur on starting, the mixture escapes into the stack and chimney where it mingles with other air and presents an explosion hazard, if a subsequent attempt at ignition following soon after is successful.

Hence, a control means which locks out on the first failure of ignition is preferable in that it allows a purging period of a duration subject to the judgment of manual aid.

Flame failure may occur as a result of impurities, such as water, getting into the fuel or because of motor burnouts or bearing seizure.

In any of the events, such as are described above, a motor-driven oil burner control means should preferably cause a full shutdown of the system, pending manual restoration of operation.

The present invention provides a control means including both a device and the circuit for operating said device, which supplies all of the needs as expressed above.

Figure 1:
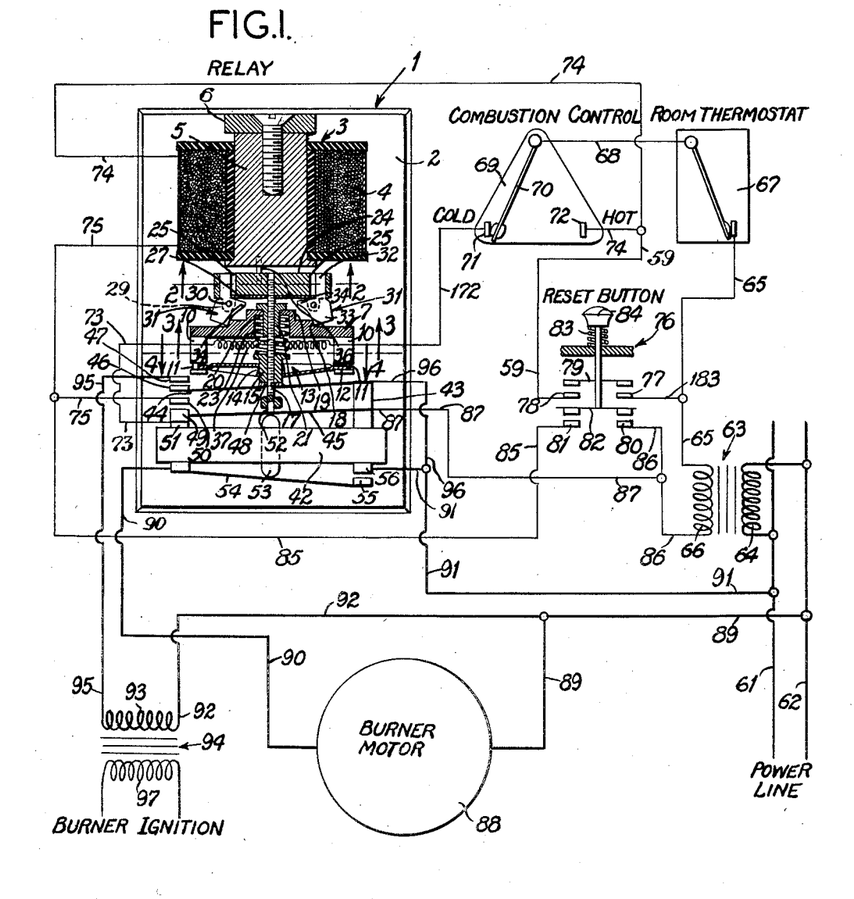
Fig. 1 is a diagrammatic view illustrating a control of the present invention, and a circuit embodying said control.

Referring now more particularly to Fig. 1, numeral 1 indicates a control means or relay, which is the principal control of the present invention. The circuit connections of the control means 1 are likewise shown and will be described hereinafter. However, it is considered advisable first to describe the control means 1, in detail.

Numeral 2 indicates a base plate upon which the control means is mounted. Near the top of the base plate 2 there is provided a permanently mounted electromagnet 3, which has windings 4 and a core 5. A bracket 6, which is mounted on the base plate 2, supports the core 5.

Numeral 7 (see also Fig. 3) indicates a second bracket mounted on the base plate 2, in position beneath the electromagnet 3. Bracket 7 has a forward pointed or triangular section 8, the three corners 9 of which support downwardly extending posts 10. Near their lower ends, the posts 10 are provided with peripheral grooves 11, which receive, in a non-binding manner, the flat periphery 12 of a radially corrugated snap-acting thermostatic disc 13. The disc 13 is of the type shown and described in John A. Spencer Patent No. 1,895,591, dated January 31, 1933. The disc 13 has a central opening 14.

A characteristic of the disc 13 is that it is formed initially so that it is slightly concave in one direction. Fig. 1 shows a downward concavity, for example. This downward concavity of Fig. 1 corresponds to relatively cold ambient temperatures. When the ambient temperature rises above a predetermined value, the thermostatic disc 13, by reason of its construction, will snap upwardly into an upwardly concave or hot position such as that shown in Fig. 5, for example. For a more detailed discussion of the operation of the thermostatic disc 13, reference is directed to the aforesaid Spencer Patent 1,895,591.

Referring again to Fig. 1, numeral 15 indicates a hub or like element which slides freely in the central opening 14 of the disc 13. The hub 15 has an outwardly extending annular flange 16 at its upper end. It is interiorly drilled and threaded to receive a stem 17, which is of considerable length.

The upper face of bracket 7 is provided with a pair of circular projections 18 and 19, which are of decreasing diameter, providing lateral steps or shoulders or abutments, for purposes to be described hereinafter. Under the projection 19 the bracket 7 is provided with a recess indicated by numeral 20. The projection 19 is centrally drilled to receive, in a sliding manner, a collar 21 which is threaded on the stem 17. The collar 21 carries an outwardly extending flange 22 at its upper end. A compression spring 23 reacts between the base of the recess 20 and the top of the hub 15.

Figures 2, 3, 5:
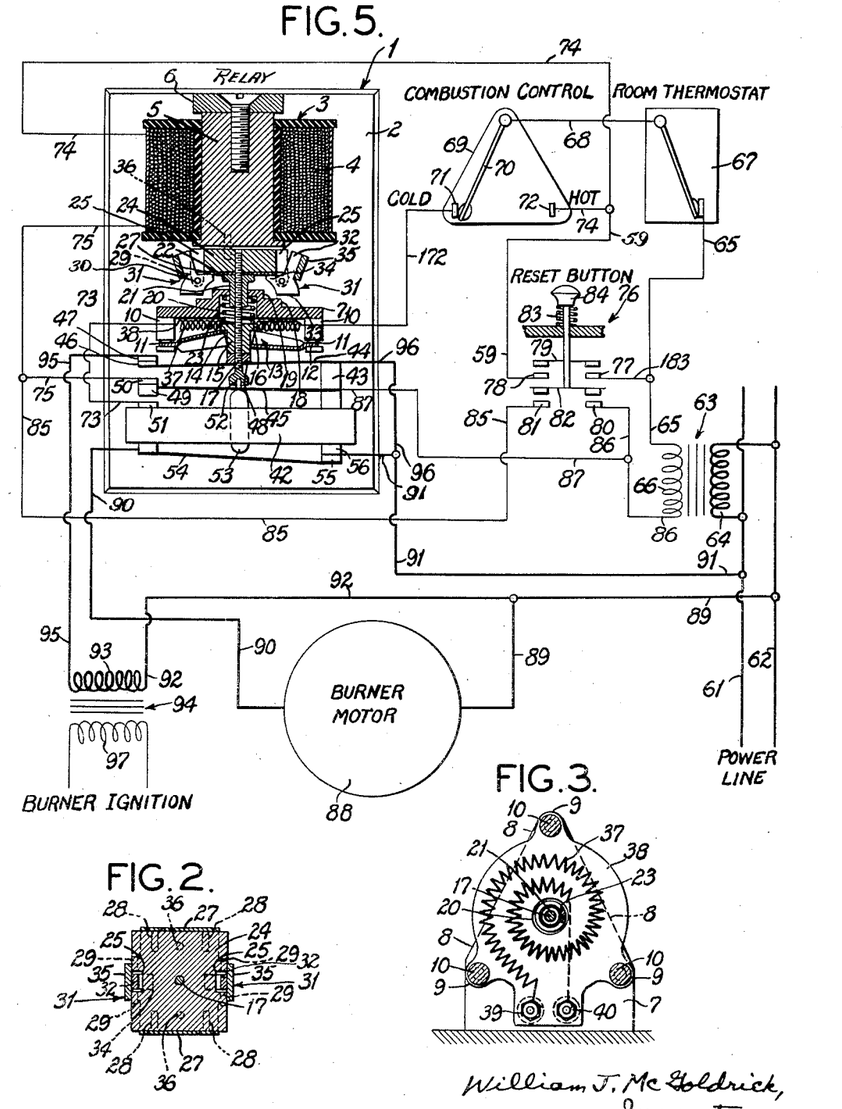
Fig. 2 is a cross section taken substantially along line 2—2 of Fig. 1.
Fig. 3 is a cross section taken substantially along line 3—3 of Fig. 1.
Figures 5, 6, and 7 are diagrammatic views similar to Fig. 1; illustrating alternative positions in the operations of the control of the present invention.
Figure 4:
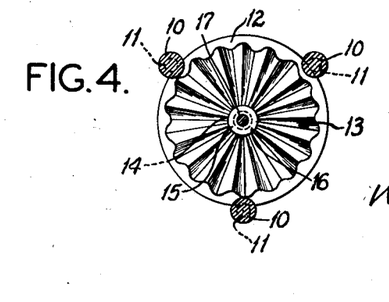
Fig. 4 is a cross section taken substantially along line 4—4 of Fig. 1.

Threaded to the upper end of the stem 17 is an armature or pole piece 24 (see also Fig. 2). At its sides, the armature 24 is provided with slots 25. The armature 24 comprises a magnetic metal such as iron. Its lower face, however, is preferably covered with a non-magnetic metallic sheet 27, which may be brass, for example. The ends of the sheet 27 are bent upwardly to embrace the front and back faces of the armature 24, and are secured thereto as by rivets or the like 28.

The sheet 27 is provided, in the regions beneath each of the slots 25, with pairs of sidewardly extending projections 29, each two of which receive and support a pivot pin 30. The pivot pins 30 serve to support rotatable latches 31, which preferably each comprise a single piece having an upward projection 32 adapted to slide into a slot 25, a downward projection 33, and a nose 34 positioned to abut the plate or sheet 27 on the under surface of the armature 24. The single piece comprising the portions 31, 32, 33, and 34 is preferably made of brass or some similar non-magnetic material. To the side of the portion 32 is welded, soldered, or otherwise secured a small magnetic piece 35, which may be iron, steel or the like. The piece 35 is sufficiently wide to extend entirely across the end of its slot 25 and, in a closed position to be described, abut the end face of the armature 24.

The shape and arrangements of the latches 31 is such that, when no magnetic forces are being applied, gravity will cause the latches to rotate outwardly until the noses 34 engage the under side of the armature 24. This is the position illustrated, for example, in Fig. 5. In this position, the ends of the portions 33 of the latches 31 are closer together than the diameter of the portion 18 of bracket 7, as shown in Fig. 5. However, when magnetic forces are present as hereinafter described, the pieces 35 are drawn to the armature 24, rotating the latches 31 to the position shown in Fig. 1, in which the lower edges of portions 33 are spaced sufficiently far apart to permit them to slip down over the projection 18 on bracket 7. The latchets 31 may thus be described as gravitationally responsive in one direction and magnetically responsive in the other direction.

A pair of pins 36 are mounted in the upper face of the armature 24 and extend upwardly into suitable openings in the pole 5 of the electromagnet 3, to prevent relative rotation of the armature 24 and the core 5.

Numeral 37 indicates an electrical resistance heating element (see also Fig. 3) which is mounted on a plate 38, preferably resistant to heat and electrically resistant, which in turn is mounted by posts 10 on the under side of the bracket 7. The ends of the coil 37 are connected to binding posts 39 and 40, respectively, on the plate 38. The coil 37 is positioned to heat the thermostatic disc 13 for reasons to be described hereinafter. The circuit connections to the coil 37 will also be described hereinafter.

Numeral 42 indicates an insulating material bracket which likewise is mounted on the base plate 2, some distance below the bracket 7. At one end of the bracket 42, there is mounted a post or pillar 43, which serves to support two parallel leaf-spring contact arms 44 and 45, respectively. The contact arm 44 carries a movable contact 46 at its end which cooperates with a suitably mounted fixed contact 47. The arm 44 and contacts 46 and 47 thus constitute a single pole, single throw switch. The stem 17 passes through the center of arm 44, and an insulating washer 48 is interposed between the lower edge of hub 15 and arm 44.

The free end of contact arm 45 carries a double-faced movable contact 49, which upwardly cooperates with a fixed contact 50, and alternatively downwardly cooperates with a fixed contact 51. The assembly comprises the arm 45, and the contacts 49, 50 and 51, thus constitutes a single pole, double throw switch. The lower end of stem 17 mounts a pin 52, preferably of insulating material, which bears upon the upper surface of the middle portion of arm 45. A somewhat larger pin 53 of insulating material, which slides in a suitable opening in the bracket 42, is disposed axially beneath the pin 52, and abuts the under surface of the spring arm 45.

On the under side of the bracket piece 42 there is mounted, at the left-hand end of the bracket 42, a third spring contact arm 54, against which the lower end of pin 53 bears. The free end of arm 54 is provided with a movable contact 55, which cooperates with a stationary contact 56 mounted on the lower face of the bracket 42. The free end of the arm 54 is at the opposite end of the bracket 42 from the end of arms 44 and 45, in order to provide a balanced thrust. The assembly comprising the arm 54 and contacts 55 and 56, constitutes a single pole, single throw switch, as will be seen.

All three of the contact arms 44, 45, and 54 are initially tensioned so that they tend to return to their upward position. This means that the contact arm 44 normally tends to juxtapose the contacts 46 and 47; the contact arm 45 normally tends to juxtapose the contacts 49 and 50; and the contact arm 54 normally tends to juxtapose the contacts 55 and 56. This is the position shown, for example, in Fig. 5.

The foregoing completes the description of the relay or control unit 1, forming part of the present invention. The circuit connections of said control unit will now be described.

Numerals 61 and 62 indicate the wires of a main power line or circuit, such as a 110-volt A. C. A low voltage transformer 63 is provided, the primary 64 of which is connected across the power circuit 61—62. One side 65 of the secondary 66 of the transformer 63 is connected to a room thermostat 67 of customary construction, the other contact of which is connected by a wire 68 to a combustion control device 69, which comprises a thermostatic blade or the like 70 adapted to move between a cold position and a hot position. The blade 70 constitutes the movable contact of a single pole, double throw switch, and is connected directly to the wire 68. In its cold position, the contact at the end of arm 70 connects with a stationary contact 71 while in its hot position, it connects with a stationary contact 72. The combustion control 69 as thus described, is exemplary only, it being necessary merely to provide a thermostatically controlled, single pole, double throw switch, in which one position corresponds to a cold position, and the other position corresponds to a hot position. The cold contact 71 is connected by a wire 172 to the terminal 39 of the electric resistance heating coil 37, while the other terminal 40 of the coil 37 is connected by a wire 73 to the lower stationary contact 51 which cooperates with the spring arm 45 of the relay 1.

The hot contact 72 of the combustion control 69 is connected by a wire 74 to one end of the winding 4 of the electromagnet 3. The other end of the winding 4 of the electromagnet 3 is connected by a wire 75 to the upper contact 50 cooperating with the spring contact arm 45 of the relay 1.

Numeral 76 indicates a manually operated switching device which is used in connection with the present invention. The switching device 76 comprises a double pole, single throw switch arranged for coextensive movement. For example, a pair of contacts 77 and 78 are provided which are bridgeable by a switching contact arm 79, and a second pair of contacts 80 and 81 are provided which are bridgeable by a contact arm 82. A compression spring 83 normally maintains both the bars 79 and 82 disconnected from their respective contacts, but by manually depressing a button 84, the contact arm 79 may be made to connect the contacts 77 and 78 while at the same time, the contact arm connects the contacts 80 and 81. The contact 77 is connected by a wire 183 to wire 65 leading from the transformer secondary 66 to the room thermostat 67. The contact 78 is connected by a wire 59 to the wire 74 leading from the hot contact 72 of combustion control 69. The contact 81 is connected by a wire 85 to the wire 75 leading from the electromagnet winding 4 to the contact 50. The contact 80 is connected by a wire 86 to the other terminal of the secondary 66 of the transformer 63. This terminal of the secondary is likewise connected, by a wire 87, to the movable contact arm 45 of the control device 1, which connects alternately with contacts 50 and 51.

Numeral 88 indicates the motor of the burner which it is desired to control. One side of the burner motor 88 is connected by a wire 89 to one side 62 of the power circuit. The other side of the motor 88 is connected by a wire 90 to the switch arm 54. The contact 56 cooperating with the switch arm 54 is connected by a wire 91 to the other power circuit line 61. Numeral 92 indicates a parallel connection from the power wire 89 leading to the motor, 88, which runs to one terminal of a primary 93 of a burner ignition transformer 94. The other terminal of the primary 93 is connected by a wire 95 to the stationary switch contact 47 of the control device 1. The switch arm 44 cooperating with the contact 47 is connected by a wire 96 to the wire 91 in the burner motor circuit, which is in turn connected to the other power line 61. Thus, the primary 93 of the burner ignition transformer 94 is connected in parallel with the burner motor 88. The secondary 97 of the burner ignition transformer 92 is connected in a suitable manner to the burner ignition means, which is not shown.

The above completes the description of the circuit employed with the control of the present invention. The operation of the control circuit will now be described.

Fig. 1 is considered as showing the control device in its normal "off" position, coil spring 23 and the downward position of thermostat 13 restraining switch arms 44, 45, and 54 from contact with their respective contacts 47, 50 and 56, respectively, but causing switch arm 45 to complete a circuit with its stationary contact 51. In Fig. 1, it will be noted that the room thermostat 67 is closed and that the combustion control 69 is in its cold position. For purposes of description, it will be assumed that the room thermostat has just closed, and that a call for heat has just been made, in order to effect a start of the oil burner.

Tracing the circuit through the room thermostat 67, it will be seen that the heating coil 37 is now energized and is radiating heat to the thermostatic disc 13. It should be noted here that if the heating coil 37 should burn out, the disc 13 would receive no heat and starting would thus be prevented.

Disc 13 eventually becomes heated to a degree which causes it to snap upwards to the position shown in Fig. 5. This allows switch arms 44, 45, and 54, respectively, to close circuits through their respective fixed contacts 47, 50 and 56; while at the same time it causes latches 31 to move inwardly, by gravity, over circular projection 18 and armature 24 to be lifted upward toward the core 5 of electromagnet 3.

Tracing the various circuits thus closed (as shown in Fig. 5), it will be seen that the ignition transformer 94 is energized through contact 47; the electromagnet circuit will be closed on one side through contact 50; and the oil burner motor circuit closed through contact 56. From this point on, two courses of events are possible: namely, (1) ignition is successful and combustion begins; or (2) ignition is not successful and there is no combustion. These will be dealt with separately but before going into this discussion it should be noted that a novel means of timing the trial period of starting the oil burner is effected.

Whereas common motor driven oil burner control means depend upon the period of heating of a thermostatic element as a trial operation time limit, the present control means depends upon the period of cooling of the thermostatic element. This novelty is a considerable improvement in the art, in that ambient temperatures which cause the cooling of the thermostatic element 13 of the present invention are much more uniform in places of oil burner location, such as the basement of houses, than are the line voltages which cause heating of thermal elements in common control means. Consequently, greater accuracy in limiting the trial period is achieved, which is important when it is remembered that the purpose of the control means is to regulate a series of events which have a definite time relation to each other.

Returning to the two possibilities depending upon the success of combustion, in the first case, if ignition is successful and good combustion is assured, the switch arm 70 of the combustion control 69 then moves over to the hot contact 72 within the cooling period of the disc 13, and closes the other side of the electromagnet circuit. As the electromagnet 3 is now energized and the armature 24 has been previously moved and held within magnetically responsive distance of the core 5 by the upward snap of the thermostatic disc 13, the armature 24 is attracted to and held in place by core 5. Thereafter, as long as there is good combustion, and demand by the room thermostat 67 continues, armature 24 allows switch arms 44, 45 and 54 to remain in "on" position, and the oil burner continues to operate.

In addition, latches 31 are moved outwardly away from projection 18 by response to magnetic attraction of the pole piece 24 upon the pieces 35.

Since the upward snap of disc 13 has broken the circuit supplying the heater coil 37, the disc 13 begins to cool off, and ultimately, when it cools sufficiently, it snaps downwardly to resume its original position where it remains ready to repeat the starting cycle again on the next demand.

Figure 6:
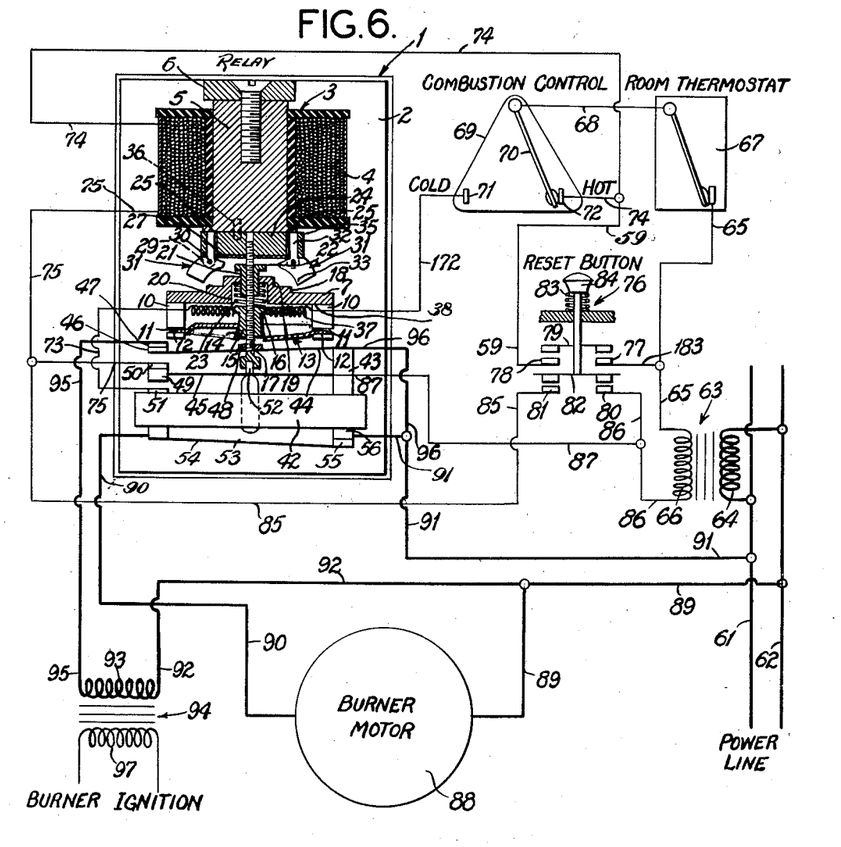

The position of the elements at this stage is as shown in Fig. 6.

Figure 7:
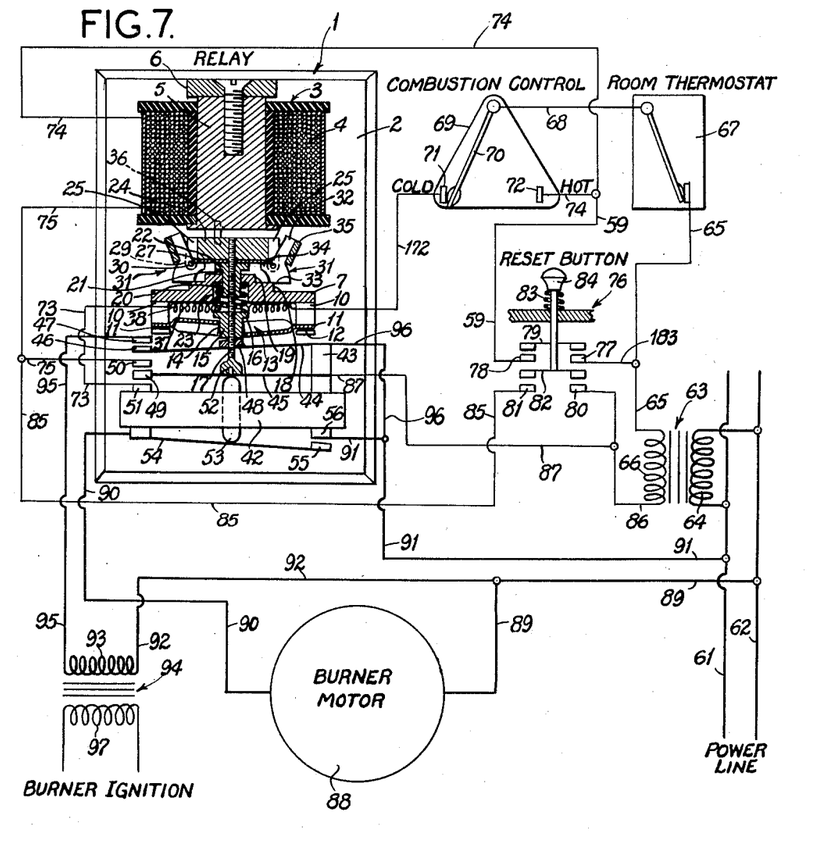

Considering now the second case hinging on combustion; that is, failure of ignition. When this occurs, the switch arm 70 of the combustion control 69 fails to move over to the hot contact 72. Hence, there is no energization of the electromagnet 3 and no magnetic attraction of the armature 24 or latches 31. In due time, therefore, when the thermostatic element 13 cools to the snapping point in a downward direction, latches 31 will come to rest on the top of projection 18, thus holding switch arms 44 and 54 away from contacts 47 and 56, and holding switch arm 45 midway between contacts 50 and 51. All control circuits to the burner motor 88 are thus locked open, and further operation is not possible until the control means is manually reset. Fig. 7 shows the positions of the several elements at this stage.

Manual resetting is provided by the manual reset switch 76. It will be noted that closing of this switch by pushing the button 84 thereof results in the energization of electromagnet 3 which will then lift the armature 24 from its suspended position and magnetically cause latches 31 to move outwardly away from the projection 18. Release of the button 84 then opens the circuit and permits the armature 24 to drop back to its normal "off" position before latches 31 can again come to rest on projection 18 by gravitational movement. From this point on, assuming that the cause of ignition failure has been corrected, the control means will now function normally in the manner already described.

To review some of the events which make it desirable for the oil burner motor 88 to be shut down and the control device 1 to be locked out if starting is undesirable, the following may be mentioned.

1. Power supply failure in power lines 61—62.
   A. Momentary or intermittent interruption.

If the electromagnet 3 is de-energized during starting, that is, before disc 13 returns to its downward position, pole piece 24 drops to suspended Fig. 7 position and, held by latches 31, breaks the electromagnet circuit through contact 50, thus locking out the control device 1.

If electromagnet 3 is de-energized during running, pole piece 24 drops to starting position, and heating coil 37 must be sufficiently energized before another start can be effected.

B. Voltage drop.

The electromagnet 3 is designed to fail to hold pole piece 24 and move latches 31 when voltage drops below point for maintenance of good combustion, thus locking out the control device 1 as in "A" above.

2. Fuel failure at oil burner.
   A. Complete failure.

As there will be no combustion, combustion control 69 fails to reach "hot" contact 72, and thus electromagnet 3 is not energized and control device 1 locks out.

B. Partial failure.

When combustion receives insufficient fuel to maintain flame and keep combustion control 69 on "hot" contact 72, electromagnet 3 is de-energized, pole piece 24 drops to starting position, and locks out if the next starting attempt is unsuccessful.

3. Ignition failure.
  Action as already described.
4. Flame failure.
  Action as described under paragraph 2, section B, above.

In the event of complete or relatively permanent power failure in power lines 61—62, the heating coil 37 receives no current in any event, and hence there is no attempt at starting.

While the system as shown in the diagram and as described thus far covers what might be called a low-voltage system with continuous or "running" ignition, modifications of the system are possible to cover systems using line voltage, or systems with intermittent or "starting" ignition only.

In some heaters the flame burns at a distance from the point of exit of fuel mixture from the burner nozzle. In others the flame may issue directly from the nozzle; hence, there is a difference of opinion as to whether the ignition should cut off or should continue after combustion is assured. It is obvious that with simple modifications of the present control means, either is possible.

It is only necessary to insert another switch in the circuit through contact arm 44, for example, which switch would be magnetically responsive to electromagnet 3. This additional switch would break the circuit to the ignition transformer 93 when the combustion control 69 reached its "hot" contact 72 and electromagnet 3 is energized.

In the matter of line voltage operation, it is only necessary to adapt the heating coil 37, electromagnet 3, combustion control 69, and room thermostat 67 to line voltage use to achieve identical performance. In this instance intermittent or "starting" ignition can be arranged by connecting switch arm 44 to the "cold" contact 71 instead of as previously described, if preferable. As combustion (hence, ignition) must take place before the combustion control switch arm 70 moves away from its "cold" contact 71, this means of shutting off ignition is practical.

It should be noted that when the windings 3 of the electromagnet 4 are energized, a magnetic field is set up within and around the core 5. This magnetic field attracts armature 24 but intentionally with insufficient power in itself to lift the armature 24 from its "off" or Fig. 1 position.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A control device comprising an electromagnet, a movable armature, actuating means for said armature capable of moving said armature alternatively to a first position in which it is magnetically responsive to said electromagnet and to a second position in which it is magnetically relatively non-responsive to said electromagnet, latching means mounted on said armature, and abutment means normally cooperating with said latching means to hold said armature in a third position between said first and second positions when said armature tends to move from its first to its second position, said latching means being responsive to magnetism in said armature by movement to a position in which no cooperation with said abutment means is had, and control-effecting means mechanically connected to said armature in such manner that the position of the armature determines the position of the control-effecting means.

2. A control device comprising an electromagnet, a movable armature, actuating means for said armature capable of moving said armature alternatively to a first position in which it is magnetically responsive to said electromagnet and to a second position in which it is magnetically relatively non-responsive to said electromagnet, latching means mounted on said armature, and abutment means normally cooperating with said latching means to hold said armature in a third position between said first and second positions when said armature tends to move from its first to its second position, said latching means being responsive to magnetism in said armature by movement to a position in which no cooperation with said abutment means is had, and electric switching means mechanically connected to said armature in such manner that the position of the armature determines the position of the switching means.

3. A control device as set forth in claim 1, in which the actuating means comprises thermostatic means having a hot position and a cold position, and electrical heating means controlling the temperature of said thermostatic means.

4. A control device as set forth in claim 2, in which the actuating means comprises thermostatic means having a hot position and a cold position, and electrical heating means controlling the temperature of said thermostatic means.

5. A control device as set forth in claim 2, in which the actuating means comprises thermostatic means having a hot position and a cold position, and electrical heating means controlling the temperature of said thermostatic means, and in which the electric heating means is in a circuit including at least one of the switching means, which switching means is arranged to interrupt the flow of current to said heating means when the aforesaid thermostatic means assumes its hot position.

6. A control device as set forth in claim 1, in which the actuating means comprises thermostatic means having a hot position and a cold position, and electrical heating means controlling the temperature of said thermostatic means, said armature being positioned in its aforesaid first position when said thermostatic means is in its hot position.

7. A control device comprising an electromagnet, an armature composed of material which is magnetically responsive, mounting means for said armature permitting it to move to and from said electromagnet, separate means for moving said armature, independently of said electromagnet, into a first position in which the armature is too far distant from said electromagnet to move in response to electrical actuation thereof, and alternatively into a second position in which the armature is sufficiently close to the electromagnet to move and be held thereto in response to electrical actuation thereof, abutment means associated with said mounting means, and at least one latching means movably mounted on said armature, said latching means having at least a part thereof composed of material which is magnetically responsive whereby, upon the establishment of a sufficient magnetic flux in said armature by reason of its juxtaposition to the electrically actuated electromagnet, said latching means is forced into a position in which it does not cooperate with said abutment means, said latching means otherwise assuming a position in which it cooperates with the abutment means in such manner as to hold the said armature from returning to its aforesaid first position.

8. A control device comprising a circuit-controlling electrical switch having a movable contact, an element mechanically coupled to said movable contact for actuating the same, a thermostat having relatively hot and cold positions, an electrical heater for heating said thermostat to cause it to move to its hot position, said heater being connected to a source of current through said switch, means coupling said thermostat and said element in such manner that as said thermostat moves to its hot position, said element opens said switch, and holds it open as long as said thermostat remains in its hot position, an armature mechanically coupled to said element, and an electromagnet positioned so that when it is energized, and when said thermostat is in its hot position, said armature is magnetically held to said electromagnet in such manner that said element maintains said switch in open position, said element, in the event of absence of energization of said electromagnet and return of said thermostat to its cold position, tending to return said switch to its closed position, relatively stationary abutment means, and latching means on said armature cooperating with said abutment means to prevent said element from closing said switch when said electromagnet is not energized and said thermostat moves from its hot to its cold position.

9. A control device comprising a circuit-controlling electrical switch having a movable contact, an element mechanically coupled to said movable contact for actuating the same, a thermostat having relatively hot and cold positions, an electrical heater for heating said thermostat to cause it to move to its hot position, said heater being connected to a source of current through said switch, means coupling said thermostat and said element in such manner that as said thermostat moves to its hot position, said element opens said switch, and holds it open as long as said thermostat remains in its hot position, an armature mechanically coupled to said element, and an electromagnet positioned so that when it is energized, and when said thermostat is in its hot position, said armature is magnetically held to said electromagnet in such manner that said element maintains said switch in open position, said element, in the event of absence of energization of said electromagnet and return of said thermostat to its cold position, tending to return said switch to its closed position, relatively stationary abutment means, and latching means on said armature cooperating with said abutment means to prevent said element from closing said switch when said electromagnet is not energized and said thermostat moves from its hot to its cold position, said latching means being composed at least in part of magnetically responsive material and thereby being magnetically responsive to magnetic flux in said armature induced by the energized electromagnet, whereby said latching means are rendered non-cooperative with said abutment means when said electromagnet is energized.

10. A control device comprising a circuit-controlling electrical switch having a movable contact, an element mechanically coupled to said movable contact for actuating the same, a thermostat having relatively hot and cold positions, an electrical heater for heating said thermostat to cause it to move to its hot position, said heater being connected to a source of current through said switch, means coupling said thermostat and said element in such manner that as said thermostat moves to its hot position, said element opens said switch, and holds it open as long as said thermostat remains in its hot position, an armature mechanically coupled to said element, and an electromagnet positioned so that when it is energized, and when said thermostat is in its hot position, said armature is magnetically held to said electromagnet in such manner that said element maintains said switch in open position, said element, in the event of absence of energization of said electromagnet and return of said thermostat to its cold position, tending to return said switch to its closed position, relatively stationary abutment means, and latching means on said armature cooperating with said abutment means to prevent said element from closing said switch when said electromagnet is not energized and said thermostat moves from its hot to its cold position, and a second electrical switch having a movable contact likewise mechanically coupled to said element for movement therewith, said second electrical switch being moved by said element from a first into a second predetermined circuit-controlling position when said thermostat moves to its hot position and being maintained thereafter in said second predetermined position for a period of time at least as long as said thermostat takes to cool sufficiently to move to its cold position, energization of said electromagnet during the interval while said thermostat is in its hot position causing said second switch to be maintained in said second predetermined position regardless of subsequent movements of said thermostat, but absence of energization of said electromagnet during the interval while said thermostat is in its hot position causing said second switch to be returned to its first predetermined position as said thermostat moves to its cold position.

11. A burner control system comprising an oil burner motor, a power circuit including said motor and an electrical switch in said power circuit having a movable contact; a control circuit including a source of power, a room thermostat which closes upon demand for heat connected in series therewith, a combustion control in series with the room thermostat, which combustion control closes a first branch circuit upon attainment of satisfactory combustion at the oil burner and which closes a second branch circuit when satisfactory combustion is not taking place at the oil burner, said first branch circuit including an electrical heater and said second branch circuit including an electromagnet, the return lead of the heater being connected to one stationary contact of a single-pole double-throw electrical switch while the return lead of the electromagnet is connected to the other stationary contact of said single-pole double-throw switch, the movable contact of said single-pole double-throw switch being connected to the aforesaid control circuit power source; an element mechanically coupled to the movable contacts of both said burner motor switch and said single-pole double-throw switch for actuating the same, a thermostat having relatively hot and cold positions and located in such manner as to be heated by the aforesaid electrical heater and thereby be caused to move to its hot position, means mechanically coupling said thermostat and said element in such manner that as said thermostat moves to its hot position, it actuates said element to close said burner motor switch to empower the burner motor and to move the movable contact of the single-pole double-throw switch from the stationary contact of the aforesaid first branch circuit to the stationary contact of the aforesaid second branch circuit, thereby to deenergize the electrical heater and to place the electromagnet in condition to be energized, said thermostat thereupon commencing to cool, an armature mechanically coupled to said element and positioned to be magnetically responsive to the aforesaid electromagnet when said electromagnet is energized and when said armature is in a position corresponding to the hot position of said thermostat, said electromagnet normally being energized during the interval that said thermostat is in its hot position by said combustion control moving to close the aforesaid second branch circuit, said electromagnet during its energization thereby maintaining said element in a switch-controlling position corresponding to that position in which it is placed by movement of the thermostat to its hot position, relatively stationary abutment means, and latching means on said armature, failure of said electromagnet to become energized during the interval that said thermostat is in its hot position resulting, upon return of said thermostat to its cold position, in movement of said element in a direction tending to return said burner motor switch and said single-pole double-throw switch to their original positions, said last-named movement being interrupted, however, by engagement of said latching means with said abutment means, with said element in such position that the burner switch is open and the movable contact of the single-pole double-throw switch is in contact with neither of its fixed contacts.

12. A burner control system comprising an oil burner motor, a power circuit including said motor and an electrical switch in said power circuit having a movable contact; a control circuit including a source of power, a room thermostat which closes upon demand for heat connected in series therewith, a combustion control in series with the room thermostat, which combustion control closes a first branch circuit upon attainment of satisfactory combustion at the oil burner and which closes a second branch circuit when satisfactory combustion is not taking place at the oil burner, said first branch circuit including an electrical heater and said second branch circuit including an electromagnet, the return lead of the heater being connected to one stationary contact of a single-pole double-throw electrical switch while the return lead of the electromagnet is connected to the other stationary contact of said single-pole double-throw switch, the movable contact of said single-pole double-throw switch being connected to the aforesaid control circuit power source; an element mechanically coupled to the movable contacts of both said burner motor switch and said single-pole double-throw switch for actuating the same, a thermostat having relatively hot and cold positions and located in such manner as to be heated by the aforesaid electrical heater and thereby be caused to move to its hot position, means mechanically coupling said thermostat and said element in such manner that as said thermostat moves to its hot position, it actuates said element to close said burner motor switch to empower the burner motor and to move the movable contact of the single-pole double-throw switch from the stationary contact of the aforesaid first branch circuit to the stationary contact of the aforesaid second branch circuit, thereby to deenergize the electrical heater and to place the electromagnet in condition to be energized, said thermostat thereupon commencing to cool, an armature mechanically coupled to said element and positioned to be magnetically responsive to the aforesaid electromagnet when said electromagnet is energized and when said armature is in a position corresponding to the hot position of said thermostat, said electromagnet normally being energized during the interval that said thermostat is in its hot position by said combustion control moving to close the aforesaid second branch circuit, said electromagnet during its energization thereby maintaining said element in a switch-controlling position corresponding to that position in which it is placed by movement of the thermostat to its hot position, relatively stationary abutment means, and latching means on said armature, failure of said electromagnet to become energized during the interval that said thermostat is in its hot position resulting, upon return of said thermostat to its cold position, in movement of said element in a direction tending to return said burner motor switch and said single-pole double-throw switch to their original positions, said last-named movement being interrupted, however, by engagement of said latching means with said abutment means, with said element in such position that the burner switch is open and the movable contact of the single-pole double-throw switch is in contact with neither of its fixed contacts, said latching means being composed at least in part of magnetically responsive material and thereby being magnetically responsive to magnetic flux in said armature induced by the energized electromagnet, whereby said latching means are rendered non-cooperative with said abutment means when said electromagnet is energized.

13. A burner control system as set forth in claim 11, in which an ignition circuit for the burner is also provided, said ignition circuit including a power source, an ignition device, and an electrical switch having a movable contact which is mechanically coupled to the aforesaid element for movement therewith in the same phase relationship as the movement of the movable contact of the burner motor switch.

14. A burner control system as set forth in claim 11 in which a by-pass circuit is provided in the aforesaid control circuit around the combustion control and the single-pole double-throw switch, the by-pass circuit including a manually operable switch, whereby, upon manual operation of said switch, said electromagnet is energized regardless of the positions of said combustion control and said single-pole double-throw switch.

15. A burner control system as set forth in claim 12 in which a by-pass circuit is provided in the aforesaid control circuit around the combustion control and the single-pole double-throw switch, the by-pass circuit including a manually operable switch, whereby, upon manual operation of said switch, said electromagnet is energized regardless of the positions of said combustion control and said single-pole double-throw switch.

16. A burner control system as set forth in claim 12 in which a by-pass circuit is provided in the aforesaid control circuit around the combustion control and the single-pole double-throw switch, the by-pass circuit including a manually operable switch, whereby, upon manual operation of said switch, said electromagnet is energized regardless of the positions of said combustion control and said single-pole double-throw switch, said by-pass circuit thereby functioning upon manual actuation thereof to relieve the locked condition brought about by engagement of said latching means with said abutment means.

WILLIAM J. McGOLDRICK.